US012759289B2

(12) United States Patent
Hayashi

(10) Patent No.: US 12,759,289 B2
(45) Date of Patent: Oct. 13, 2026

(54) CONTROL APPARATUS, INKJET PRINTING APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Masashi Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 18/617,041

(22) Filed: Mar. 26, 2024

(65) Prior Publication Data

US 2024/0326411 A1 Oct. 3, 2024

(30) Foreign Application Priority Data

Mar. 28, 2023 (JP) ................................ 2023-051988

(51) Int. Cl.
*B41J 2/045* (2006.01)
*G06F 3/12* (2006.01)

(52) U.S. Cl.
CPC ......... *B41J 2/04573* (2013.01); *B41J 2/0458* (2013.01); *G06F 3/1208* (2013.01); *G06F 3/1217* (2013.01); *G06F 3/124* (2013.01)

(58) Field of Classification Search
CPC .... B41J 2/0458; B41J 2/04563; B41J 2/0451; B41J 2/0454; B41J 2/072; B41J 2/04573; B41J 2002/16573; G06F 3/1217; G03G 15/0856
See application file for complete search history.

(56) References Cited

U.S. PATENT DOCUMENTS

| | | | | |
|---|---|---|---|---|
| 6,557,969 | B1 * | 5/2003 | Murakami | B41J 2/16532 347/30 |
| 2002/0090222 | A1 * | 7/2002 | Ahn | G03G 15/0856 399/27 |
| 2004/0227781 | A1 * | 11/2004 | Kaburagi | B41J 2/04568 347/14 |
| 2011/0085003 | A1 * | 4/2011 | Oonuki | B41J 2/04563 347/17 |
| 2013/0187969 | A1 * | 7/2013 | Miyahara | B41J 2/0458 347/14 |
| 2016/0339692 | A1 * | 11/2016 | Taira | B41J 2/14153 |
| 2017/0282586 | A1 * | 10/2017 | Sasaki | B41J 2/175 |

(Continued)

FOREIGN PATENT DOCUMENTS

| | | |
|---|---|---|
| JP | 2005224955 A | 8/2005 |

*Primary Examiner* — John P Zimmermann
(74) *Attorney, Agent, or Firm* — Canon U.S.A., Inc. IP Division

(57) ABSTRACT

There is provided a control apparatus that comprises at least one processor and at least one memory coupled to the at least one processor. The at least one memory stores instructions that, when executed by the at least one processor, cause the at least one processor to count data representing outputs of a plurality of printing elements of a printhead in printing data used in one scan of the printhead of an inkjet printing apparatus, and based on a threshold and a printing dot count representing a sum of the data counted in the printing data, set at least one of (a) a wait time after printing according to the printing data or some of the printing data, and (b) division of the printing data.

14 Claims, 9 Drawing Sheets

(56) References Cited

U.S. PATENT DOCUMENTS

| | | | | |
|---|---|---|---|---|
| 2018/0009233 | A1 * | 1/2018 | Uryu | B41J 2/3555 |
| 2019/0299601 | A1 * | 10/2019 | Oikawa | B41J 2/0451 |
| 2021/0060927 | A1 * | 3/2021 | Oikawa | B41J 2/0454 |
| 2022/0388321 | A1 * | 12/2022 | Takekoshi | B41J 2/16535 |

* cited by examiner

FIG. 7

| PAPER TYPE | PRINTING QUALITY | PASS COUNT | CARRIAGE SPEED | MAXIMUM WAIT TIME |
|---|---|---|---|---|
| PLAIN PAPER | STANDARD | 1 | 40ips | 0.200s |
| RECYCLED PAPER | STANDARD | 1 | 40ips | 0.080s |

FIG. 8

| DOT COUNT | 0 TO 491520 | 491521 TO 983040 | 983041 TO 1474560 | 1474561 TO 1966080 | 1966081 TO 2457600 |
|---|---|---|---|---|---|
| WAIT TIME (s) | 0.000 | 0.000 | 0.000 | 0.000 | 0.000 |

| DOT COUNT | 2457601 TO 2949120 | 2949121 TO 3440640 | 3440641 TO 3932160 | 3932161 TO 4423680 | 4423681 TO 4915200 |
|---|---|---|---|---|---|
| WAIT TIME (s) | 0.000 | 0.020 | 0.080 | 0.140 | 0.200 |

CONTROL APPARATUS, INKJET PRINTING APPARATUS, METHOD, AND NON-TRANSITORY COMPUTER-READABLE STORAGE MEDIUM

BACKGROUND

Field of the Disclosure

The present disclosure relates to a control apparatus, an inkjet printing apparatus, a method, and a non-transitory computer-readable storage medium.

Description of the Related Art

A printhead used in an inkjet printing apparatus (to be referred to as a printing apparatus hereinafter) discharges an ink droplet by energy generated by applying electric energy to a printing element and applies a dot on a print medium, thereby printing an image. In the printing apparatus, ink is supplied from an ink tank via a supply flow path, and an image is printed by controlling the printhead based on image data designated from a user.

In recent years, the multi-element arrangement of printing elements arranged in the printhead progresses to cope with the demand for high-speed printing, so that power used in the printhead tends to increase. From the above circumstances, the printing apparatus must have a circuit arrangement capable of outputting a high power, and increases in cost and size pose a problem.

If the driving count of the printing element in a prospective printing area of an image is larger than a predetermined threshold, setting for reducing the scan speed of a carriage mounted with the printhead thereon or setting for performing the printing of the prospective printing area by a plurality of scans are described (Japanese Patent Laid-Open No. 2005-224955). In this manner, the printing data is analyzed before the printing operation to suppress the power consumed by the printhead. The decrease in throughput can be suppressed while the power required for the printing apparatus is limited to a value equal to or smaller than a predetermined amount.

SUMMARY

According to the present disclosure, there is provided a technique for suppressing the degradation of the image quality even if the power consumption of the printhead is limited.

Some embodiments of the present disclosure provide a control apparatus comprising at least one processor, and at least one memory coupled to the at least one processor. The at least one memory stores instructions that, when executed by the at least one processor, cause the at least one processor to count data representing outputs of a plurality of printing elements of a printhead in printing data used in one scan of the printhead of an inkjet printing apparatus, and, based on a threshold and a printing dot count representing a sum of the data counted in the printing data, set at least one of (a) a wait time after printing according to the printing data or some of the printing data, and (b) division of the printing data.

Some embodiments of the present disclosure provide a method comprising counting data representing outputs of a plurality of printing elements of a printhead in printing data used in one scan of the printhead of an inkjet printing apparatus, and, based on a threshold and a printing dot count representing a sum of the data counted in the printing data, setting at least one of (a) a wait time after printing according to the printing data or some of the printing data, and (b) division of the printing data.

Some embodiments of the present disclosure provide a non-transitory computer-readable storage medium storing instructions that, when executed by a computer, cause the computer to perform a method comprising counting data representing outputs of a plurality of printing elements of a printhead in printing data used in one scan of the printhead of an inkjet printing apparatus, and, based on a threshold and a printing dot count representing a sum of the data counted in the printing data, setting at least one of (a) a wait time after printing according to the printing data or some of the printing data, and (b) division of the printing data.

Further features of various embodiments of the present disclosure will become apparent from the following description of exemplary embodiments (with reference to the attached drawings).

BRIEF DESCRIPTION OF THE DRAWINGS

FIG. 7 is a table showing an example of the printing mode of the printing apparatus according to the first embodiment;

FIG. 8 is a table defining the relationship between a maximum wait time and a printing dot count according to the first embodiment;

DESCRIPTION OF THE EMBODIMENTS

Figure 1A:
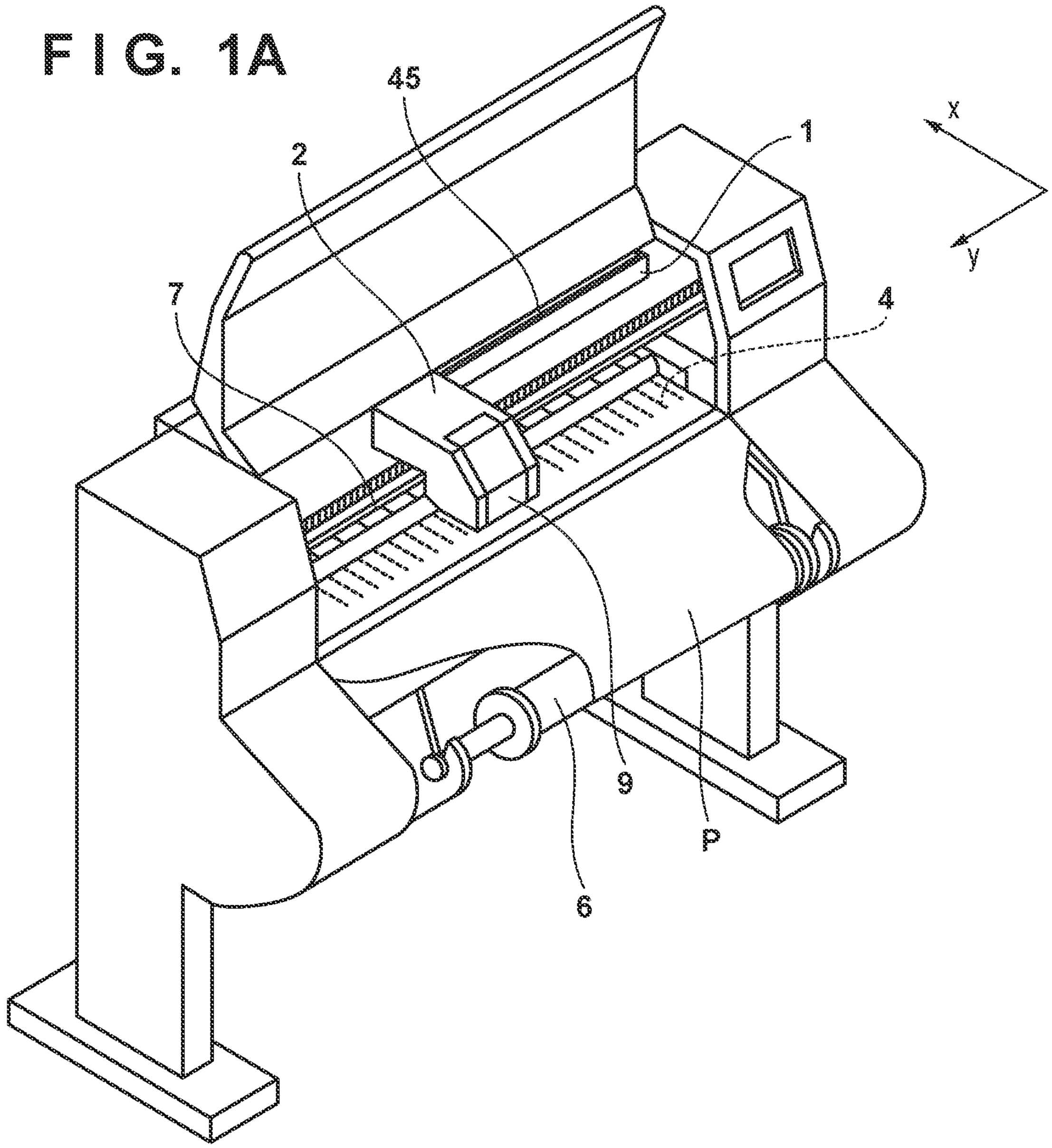
FIG. 1A is a view for explaining the hardware arrangement of a printing apparatus according to the first embodiment.

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

First Embodiment

A printing apparatus according to the first embodiment analyzes printing data of one scan of a print buffer in advance and compares a printing dot count obtained by counting data representing the outputs of the plurality of printing elements in the printing data with a threshold (a maximum printing dot count). The printing apparatus sets a wait time (standby time) after the printing scan processing based on the comparison result of the printing dot count and the maximum printing dot count. In addition, based on the above-described comparison result, the printing apparatus divides the printing data into a predetermined number of data and sets the wait time after each printing scan processing based on each printing data. Alternatively, the printing apparatus performs only setting for dividing the printing data into a predetermined number of data. In this manner, in the first embodiment, the wait time setting and the printing data division setting are combined based on the printing dot count and the maximum printing dot count, thereby performing the printing scan processing. In the first embodiment, since printing is performed on the print medium by each scan at the same scan speed, the degradation of the image quality can be suppressed.

Figure 1B:
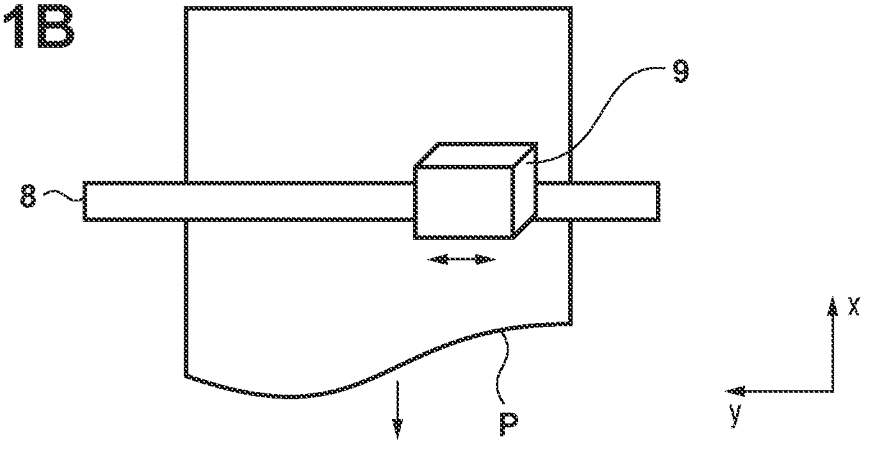
FIG. 1B is a view showing the hardware arrangement of the printing apparatus according to the first embodiment.

FIGS. 1A and 1B are views for explaining the hardware arrangement of the printing apparatus according to the first embodiment. FIG. 1A is a perspective view of the printing apparatus according to the first embodiment. An embodiment of the present disclosure will be described with reference to the accompanying drawings.

The printing apparatus according to this embodiment is a so-called serial scan type inkjet printing apparatus. An X direction is a convenance direction of a print medium P. A Y direction is a direction perpendicular to the X direction. The Y direction is a scan direction of a carriage unit 2 on which a printhead 9 is mounted. By driving printing elements 22 arranged on the printhead 9 during the scan of the carriage unit 2, ink droplets are applied to the print medium P, thereby printing an image on the print medium P. Note that a Z direction (not shown) is a direction perpendicular to the X and Y directions.

The arrangement of the printing apparatus and the printing operation will be described with reference to FIG. 1A. A paper feed roller is driven by a paper feed motor 5 (not shown) via a gear in a state in which the print medium P is held on a spool 6, and the print medium P is fed and conveyed to a position where the printhead 9 can perform printing. On the other hand, at a predetermined conveyance position, the carriage unit 2 on which the printhead 9 is mounted is scanned along a guide shaft (not shown) extending in the Y direction of FIG. 1A by using a carriage motor 3 (not shown). Note that the printhead 9 is detachably mounted on the carriage unit 2. During execution of one scan, each printing element arranged on the printhead 9 is driven at a timing based on a position signal obtained by an encoder 7. By driving this printing element, an ink droplet is discharged from a discharge port (nozzle) and is landed on the print medium P. In one scan of the carriage unit 2, an image is printing on the area of the print medium P which corresponds to the array range of the printing elements arranged on the printhead 9. The printing width corresponding to the array range of the printing elements is called a "band width". In this embodiment, the scan speed of the carriage unit 2 is 40 inches/sec. The printing resolution of the carriage unit 2 is 600 dots/inch, that is, 600 dpi (dots/inch).

After one scan, the print medium P is conveyed by a predetermined amount in the X direction. After that, in the next scan, an image is printing in the area of the print medium P which corresponds to the next band width. In this manner, the printing apparatus may take the band width during each scan, that is a form in which the print medium P is conveyed by the array range of the printing elements. Alternatively, the printing apparatus may take a form in which the print medium P is conveyed after a plurality of scans without conveying the print medium P for each scan. The ink is applied to the print medium P based on the thinned printing data in n scans, and the print medium P is conveyed by a 1/n band width during each scan. In this manner, a method (so-called multi-pass printing) of printing an image by changing the printing elements used for printing of the same area of the print medium P in order to prevent degradation of the image quality may be used.

Although the details will be described later with reference to FIG. 2, a plurality of printing elements for discharging ink are arrayed in the printhead 9 of this embodiment in the X direction of FIG. 1A. One end of a flexible wiring board 1 for supplying a signal pulse for driving each printing element is attached to the printhead 9. The other end of the flexible wiring board 1 is connected to a control circuit (not shown) for executing the control of the printing apparatus.

A carriage belt (not shown) is used to transmit the driving force from the carriage motor 3 to the carriage unit 2. In place of the carriage belt, another driving system including a lead screw rotated by, for example, the carriage motor and extending in the scan direction (the Y direction) and an engaging portion formed in the carriage unit 2 and engaging with the groove of the lead screw may be used.

The print medium P fed and conveyed is clamped and conveyed by a paper feed roller and a pinch roller and guided to a printing position on a platen 4, that is, the scan area of the printhead 9. Note that in a pause state, since the face surface of the printhead 9 is capped, the cap is opened prior to printing, and the printhead 9 and the carriage unit 2 can be set in a scan enable state. When printing data of one scan is accumulated in a print buffer 121 (to be described later), the carriage unit 2 is scanned by the carriage motor 3. Accordingly, a predetermined image is printed on the print medium P.

FIG. 1B is a schematic view showing the operations of the print medium and the printhead in the serial scan type printing apparatus. FIG. 1B is a view when the printhead 9 and the print medium P are viewed from the above the printing apparatus. The operation of the serial printing scheme will be described with reference to FIG. 1B. By driving the carriage motor 3, the printhead 9 mounted on the carriage unit 2 performs scanning. The printhead 9 prints an image on the print medium P while performing reciprocal scanning in the widthwise direction (the Y direction) of the print medium P perpendicular to the conveyance direction (the X direction indicating by a down arrow in FIG. 1B) of the print medium P.

<Arrangement of Printhead>

Figure 2C:
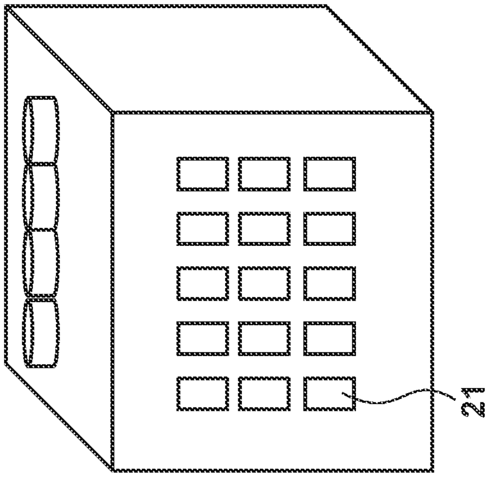
FIG. 2C is a view for explaining the arrangement of the printhead according to the first embodiment.
Figure 2B:
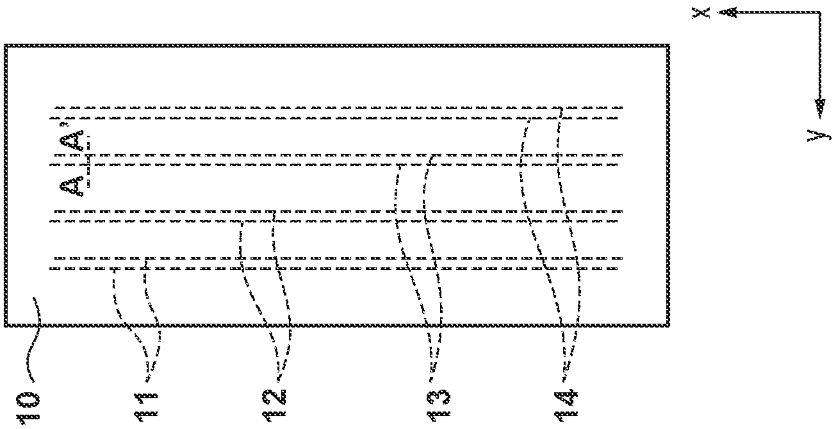
FIG. 2B is a view for explaining the arrangement of the printhead according to the first embodiment.
Figure 2A:
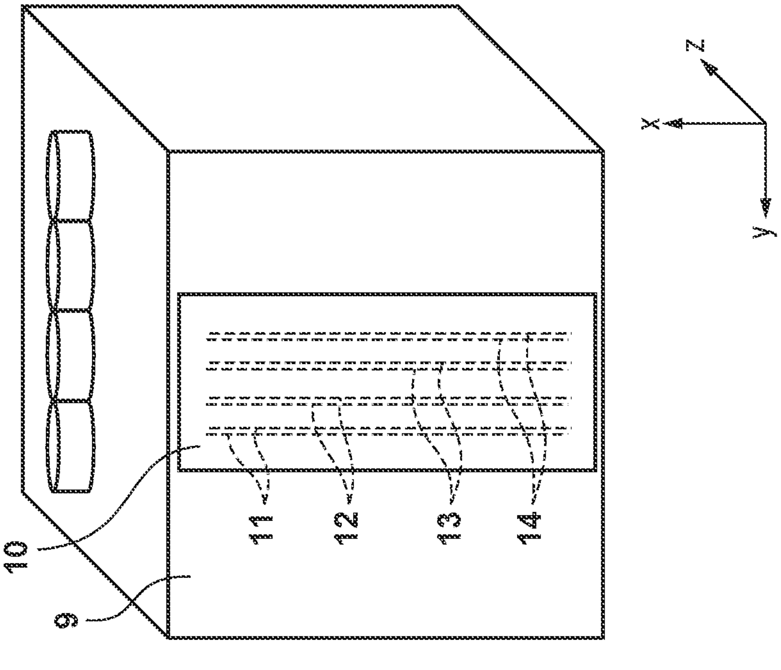
FIG. 2A is a view for explaining the arrangement of a printhead according to the first embodiment.

FIGS. 2A to 2C are views for explaining the arrangement of the printhead according to the first embodiment.

FIG. 2A is a perspective view for explaining a printing element board of the printhead. A printing element board 10 is mounted on the printhead 9. A printing element array 11, a printing element array 12, printing element array 13, and printing element array 14 capable of discharging black (Bk), cyan (C), magenta (M), and yellow (Y) inks, respectively, are arrayed on the printing element board 10. The inks are supplied from the common liquid chamber 26 (to be described later) to the printing element array 11 to the printing element array 14 via internal ink flow paths 24 of the printhead 9.

FIG. 2B is an enlarged plan view of the printing element board in FIG. 2A. Note that in this embodiment, two printing element arrays for each ink color are arranged. 256 printing elements are arranged in each printing element array at a pitch of 600 dpi in the X direction. In addition, 512 printing elements of each color are arranged to be shifted by a half pitch of the facing printing element arrays, that is, by a pitch of 1,200 dpi. A discharge port is formed in each printing element. An ink droplet is discharged from each discharge port by driving the corresponding printing element.

FIG. 2C is a perspective view showing the connection portion between the printing apparatus and the printhead, which is located on the opposite side of the printing element board in FIG. 2A. The connection between the printhead 9 and the printing apparatus will be described with reference to FIG. 2C. The printhead 9 and the printing apparatus are electrically connected via contact pads 21 and the flexible wiring board 1 in FIG. 1A. The electrical signal for controlling the discharge of the ink droplet and the power consumed by the printhead 9 are supplied to the printhead 9 via the contact pads 21. A reception mechanism, such as a pin, is disposed in the printing apparatus to fix the printhead 9 to the printing apparatus. The printhead 9 is pressed and fixed to the printing apparatus to implement an arrangement for stable connection.

Figure 3:
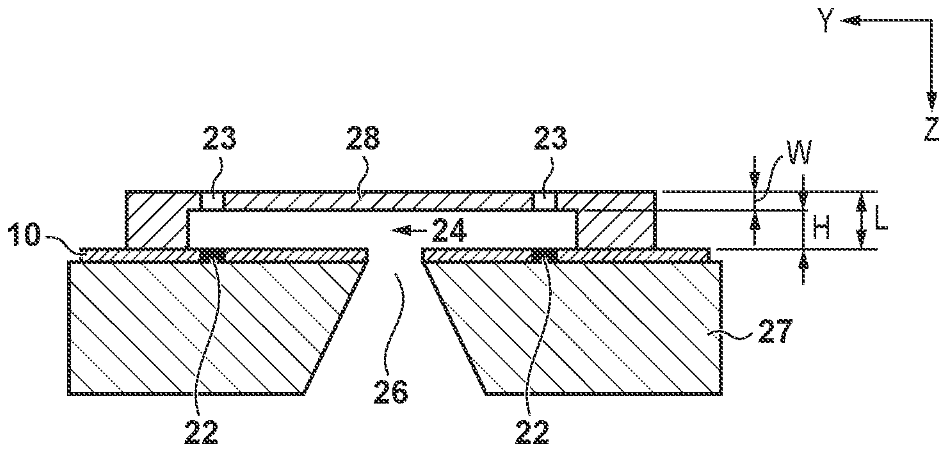
FIG. 3 is a sectional view of a printing element board along a line A-A' of FIG. 2B.

FIG. 3 is a sectional view of the printing element board along the like A-A' in FIG. 2B. FIG. 3 shows a support board 27, printing elements 22, and ink discharge ports 23. The ink flow path 24 is formed between the printing element board 10 and an orifice plate 28. A partition wall (not shown) is formed between the plurality of ink flow paths 24. The printing element 22 according to this embodiment is an electrothermal conversion element, converts electric energy into thermal energy, and is heated. The printing element 22 is formed on the printing element board 10 to face the ink discharge port 23, and a protective film or the like is formed on the surface of the printing element 22. Ink is supplied to each ink flow path 24 via the common liquid chamber 26 communicating with the respective ink flow paths 24 from below in FIG. 3.

<Arrangement Example of Control System>

Figure 4:
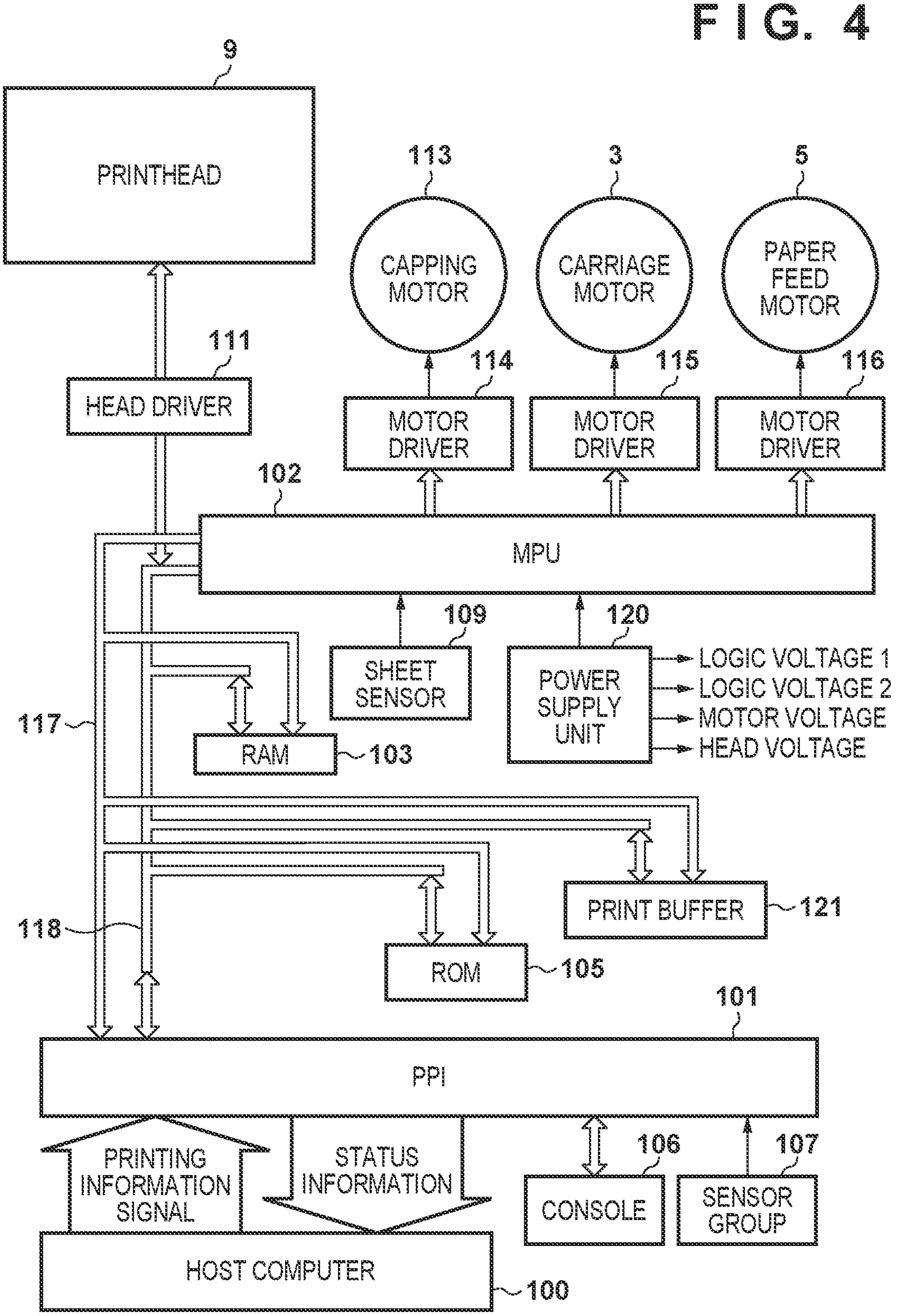
FIG. 4 is a view showing an example of a control circuit of the printing apparatus according to the first embodiment.

FIG. 4 is a view showing an example of the control circuit of the printing apparatus according to the first embodiment. A PPI 101 receives a printing information signal including a command signal (command) sent from a host computer 100 and printing data and transfers them to an MPU 102. The PPI is the abbreviation of the programmable peripheral interface. The PPI 101 outputs status information of the printing apparatus to the host computer 100 as needed. In addition, the PPI 101 inputs/outputs data with a console 106 including a setting input unit for allowing the user to perform various types of settings to the printing apparatus and a display unit for displaying a message to the user. In addition, the PPI 101 receives input signals from a sensor group 107 including a home position sensor for detection that the carriage unit 2 or the printhead 9 is located at the home position, a capping sensor, and the like.

The MPU 102 controls the respective components in the printing apparatus in accordance with a control program stored in a ROM 105. Note that the MPU is the abbreviation of a microprocessing unit. A RAM 103 stores a received signal and is used as the work area of the MPU 102. The RAM 103 temporarily stores various data.

The print buffer 121 is a memory area storing the printing data deployed in the RAM 103 and the like and having a capacity of a plurality of printing lines. The ROM 105 stores permanent data corresponding to data and the like used in control processing (to be described later) in addition to the above control program. The ROM 105 and the like are controlled by the MPU 102 via the address bus 117 and a data bus 118.

A motor driver 114, a motor driver 115, and a motor driver 116 are motor drivers for driving a capping motor 113, the carriage motor 3, and the paper feed motor 5, respectively, in accordance with control of the MPU 102.

A sheet sensor 109 detects the presence/absence of the print medium P, that is, whether the print medium P is supplied to a position where the printhead 9 can perform printing. A head driver 111 is a driver for driving the printing element of the printhead 9 in accordance with the printing information signal. A power supply unit 120 is a power supply unit for supplying power to each component and includes an AC adapter and a battery as the driving power supply units. Note that the power supply unit 120 of this embodiment supplies, to the printing element 22, the power for discharging the ink droplet from each ink discharge port 23 of the printhead 9.

In the printing system including the printing apparatus and the host computer 100, a predetermined command is added to the head portion of the printing data when transmitting the printing data from the host computer 100 via a parallel port, an infrared port, a network, or the like. Examples of the predetermined command are the type of a print medium on which an image is printed, the print medium size, the printing quality, and presence/absence of automatic object determination. Examples of the type of print medium are plain paper, recycled paper, an OHP sheet, glossy paper, and the like, and specific print media such as a transfer film, thick paper, and burner paper. Examples of the medium size are A0, A1, A2, A3, A4, B0, B1, and B2 sizes. Examples of the printing quality are standard, draft, and high quality. If an arrangement for applying a processing liquid for improving fixability of ink on the print medium P is employed, information for determining the presence/absence of applying the processing liquid to the print medium P is transmitted as a command.

In accordance with this command, the printing apparatus performs printing on the print medium P based on data obtained by reading data necessary for printing from the ROM 105. Examples of the data necessary for printing are a printing pass count (scan count) when the above-described multi-pass printing is performed, the ink application amount per unit area of the print medium P, and the data for determining the printing direction or the like. Examples of the data necessary for printing are the type of a data thinning mask applied for the multi-pass printing, the driving condition (for example, the shape of the driving pulse applied to the printing element 22, the application time, and the like) of the printhead. In addition, examples of the data necessary for printing are data of the dot size, the conveyance condition of the print medium P, the number of colors used for printing, and the conveyance speed of the carriage unit 2.

Figure 5:
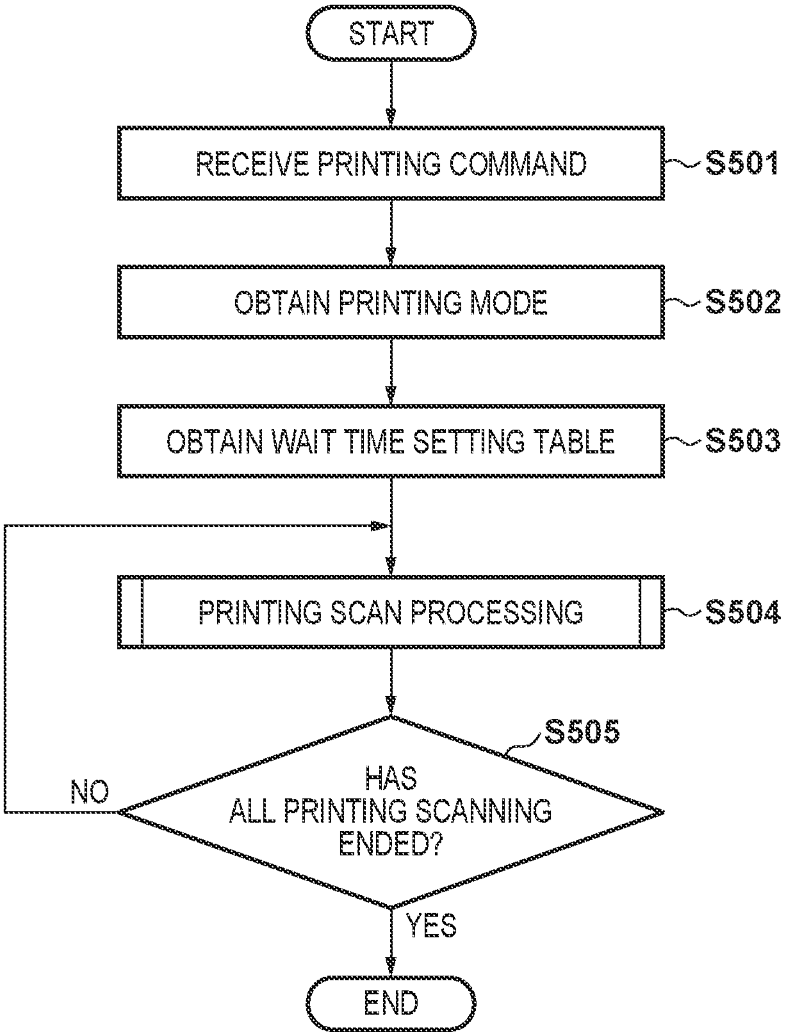
FIG. 5 is a flowchart for explaining printing control processing according to the first embodiment.

FIG. 5 is a flowchart for explaining printing control processing according to the first embodiment. When the MPU 102 executes the program stored in the ROM 105, printing control processing of this flowchart is implemented.

In step S501, the MPU 102 receives the printing command from the user via the console 106.

In step S502, the MPU 102 analyzes the printing command of the user to obtain the printing mode. In this case, FIG. 7 shows a table indicating an example of the printing mode of the printing apparatus according to the first embodiment. The details of the printing control contents of the printing apparatus are defined based on the paper type and printing quality selected by the user in FIG. 7. The pieces of information, such as the printing pass count, the carriage speed, and the maximum wait time (to be described later), are described in the table. In this embodiment, the user sets plain paper as the type of paper and standard printing quality. The maximum wait time will be described below.

The maximum wait time is a maximum standby time for stopping the printing operation of the printing apparatus. In the printing apparatus according to this embodiment, the number of printing elements per color is given as 512 nozzles, the number of ink colors is given as four colors, the maximum printable width in the scan direction (the Y direction) is given as 8 inches, and the driving resolution of the printing elements is given as 600 dpi. In this printing apparatus, the maximum printing dot count (per color) of one scan is given as 512 nozzles (per color)×8 inches×600 dpi=2,457,600 dots. The maximum printing dot count of four colors of one scan is given as 2,457,600 dots (the maximum printing dot count per color)×4 colors=9,830,400 dots. Note that the allowable average current amount per unit time applied to the printhead 9 exists due to the current amount restriction, such as the power supply and electrical wiring arrangement of the printing apparatus. That is, the maximum printing dot count capable of driving the printing elements per scan is limited.

The average current amount is proportional to a value obtained by dividing the number of printing dots to be printed per scan by the printhead 9 by the time from the start of one scan to the start of the next scan. For this reason, even if the printing dot count per scan is kept unchanged, and if the time from the start of one scan to the start of the next scan is long, the average current value is reduced. On the other hand, even if the printing dot count per scan is kept unchanged and if the time from the start of one scan to the start of the next scan is short, the average current value is increased. That is, before the start of the next scan, the average current amount can be reduced by adding the wait time for stopping the carriage unit 2. Based on this concept, the average current amount is close to zero by infinitely increasing the wait time.

However, if the wait time is excessively long, the user may erroneously recognize that the state in which the printing operation of the printing apparatus is stopped is the failure state of the printing apparatus. In addition, if the wait time is long as compared with a case where the wait time is short, since the permeation of ink applied to the print medium P during the elapse of the wait time progresses, the overlap of the ink droplets changes at a portion where the ink droplet applied to the next scan contacts the ink droplet applied to the previous scan, so that image streaks appear, thereby degrading the image quality. The upper limit of the wait time set to solve this problem is the “maximum wait time”. In this embodiment, the MPU 102 refers to the printing mode table in FIG. 7 and determines that the maximum wait time corresponding to the conditions including the paper type as plain paper and the printing quality as the standard quality is given as 0.200 s. In this specification, “s” represents “sec” as the unit of time. A described will return to the description with reference to FIG. 5.

In step S503, the MPU 102 sets the maximum wait time corresponding to the printing dot count per scan. Setting of the maximum wait time corresponding to the printing dot count per scan will be described with reference to FIG. 8. FIG. 8 is a table defining the relationship between the maximum wait time and the printing dot count according to the first embodiment. A method of setting the maximum wait time corresponding to the printing dot count will be described with reference to FIG. 8.

The allowable printing dot count per unit time is given as 8,192,000 dots/s in consideration of the restriction of the allowable average current amount per unit time in the printing apparatus according to this embodiment. In addition, assume that the one scan time of the 8-inch paper width is given as 0.400 s. In this case, if the printing dot count of one scan is given as 4,423,680, the average printing dot count per unit time is given as 4,423,680 dots/0.400 s=11,059,200 dots/s. In this case, the average printing dot count (11,059,200 dots/s) exceeds the allowable printing dot count (8,192,000 dots/s). At this time, since the allowable average current amount per unit time applied to the printhead 9 is exceeded, the printhead 9 cannot be driven.

A wait time of 0.140 s is formed between the start of a given scan and the start of the next scan. Accordingly, the average printing dot count per unit time is given as 4,423,680 dots/(0.400 s+0.140 s)=8,192,000 dots/s. In this case, the average printing dot count (8,192,000 dots/s) is equal to the allowable printing dot count (8,192,000 dots/s). If control is performed such that the average printing dot count is equal to the allowable printing dot count, the printhead 9 can be continuously driven. Note that the maximum wait time may be changed using a table different from the table in FIG. 8, and the average printing dot count may be controlled to be smaller than the allowable printing dot count. The maximum wait time to continue driving of the printhead 9 is described in FIG. 8.

On the other hand, the average printing dot count can be reduced by changing printing from printing of one scan to printing of a plurality of scans. However, since the number of scans increases, the throughput is reduced. That is, the printing time of the printed product becomes long. In this embodiment, by setting the maximum wait time, the average printing dot count can be reduced without excessively increasing the scan count, and the printing operation of the printing apparatus can be continued.

The maximum wait time corresponding to a printing dot count larger than 4,915,200 dots is not described in the maximum wait time setting table in FIG. 8. This is because it is assumed that the printing operation of the printhead 9 is performed at a maximum printing dot count equal to or smaller than the maximum printing dot count (4,915,200 dots) of one scan. For example, if the maximum printing dot count of one scan exceeds 4,915,200 dots, and even if the maximum wait time of 0.200 s is set, the average printing dot count exceeds the allowable printing dot count. The maximum wait time longer with the maximum wait time of 0.200 s is not set because of the degradation (for example, the user erroneously recognizes the failure of the printing apparatus) of usability and the degradation of the image quality as described above. For this reason, if the maximum printing dot count of one scan exceeds 4,915,200 dots, the printing setting is changed so that printing of a plurality of scans can be performed from the printing of one scan.

The maximum printing dot count is set as the maximum printing dot count of one scan. In addition, the maximum printing dot count depends on the maximum wait time. The maximum wait time can be set to be equal to a value suitable for each printing mode. For example, if the printing mode set by the user is “paper type: recycled paper, printing quality:

standard". "0.080 s" is set as the maximum wait time shown in FIG. 7. Different maximum wait times for the respective paper types are set because the permeation state of the ink changes depending on the paper type. In this manner, the maximum wait time in consideration of the change in appearance characteristic of the image streaks posing the above-described problem is set for each paper type, thereby preventing occurrence of the image streaks. Note that if the maximum wait time is 0.080 s, the MPU 102 refers to the maximum wait time setting table in FIG. 8 and sets 3,932,160 dots as the maximum printing dot count. A description will return to the description with reference to FIG. 5.

In step S504, the MPU 102 performs printing scan processing. The details of the printing scan processing will be described in detail with reference to FIG. 6.

Figure 6:
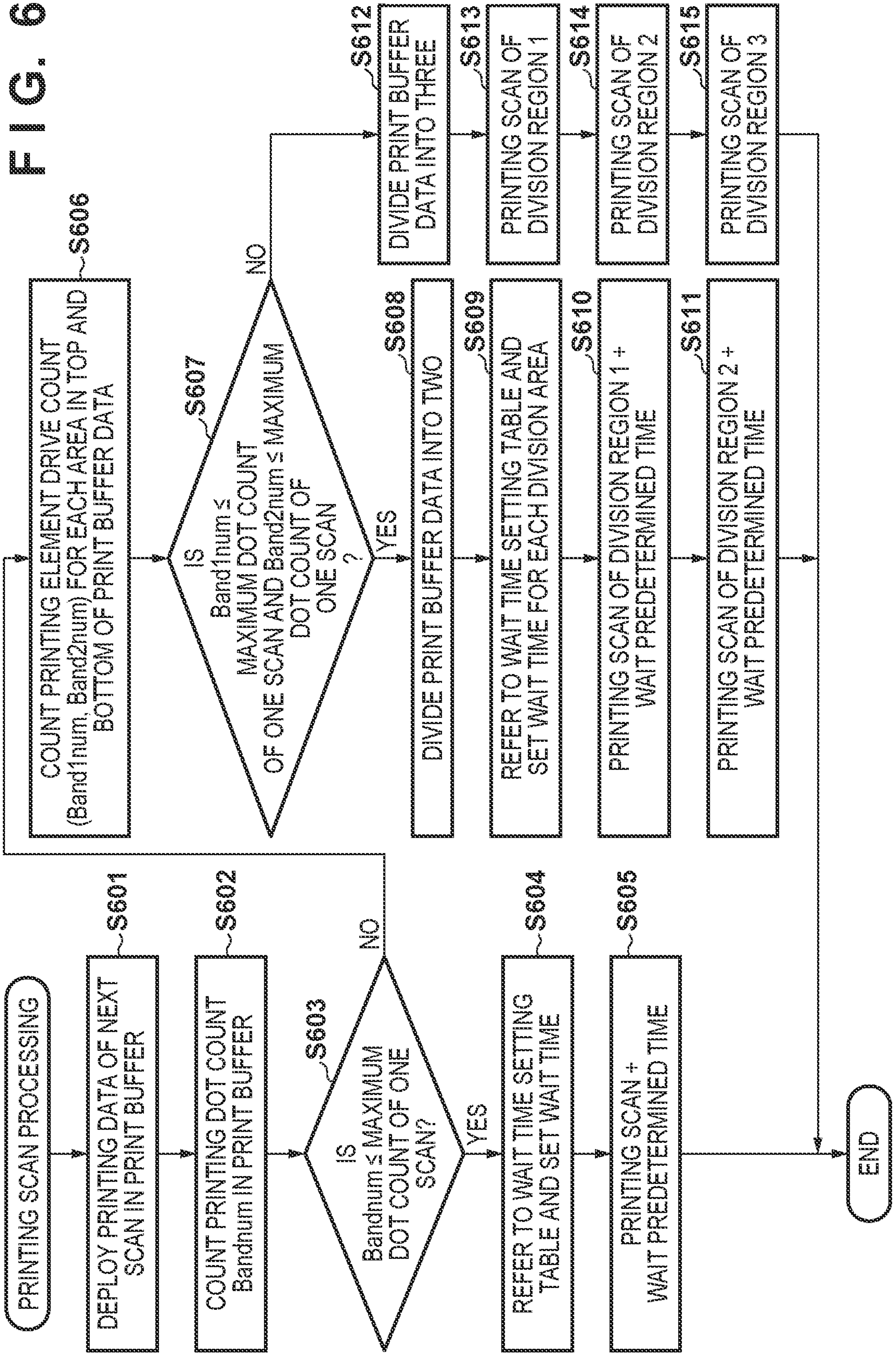
FIG. 6 is a flowchart for explaining printing scan processing of the printing apparatus according to the first embodiment.

FIG. 6 is a flowchart for explaining the printing scan processing of the printing apparatus according to the first embodiment.

In step S601, the MPU 102 deploys the printing data of the next scan in the print buffer 121. The printing data is deployed in a band-like memory area corresponding to the vertical size (=printing element count) of 512 per ink color and the horizontal size (=the Y-direction image printable width of 8 inches×600 dpi) of 4,800. That is, the printing data whose number corresponds to the number of ink colors is deployed.

Figure 9:
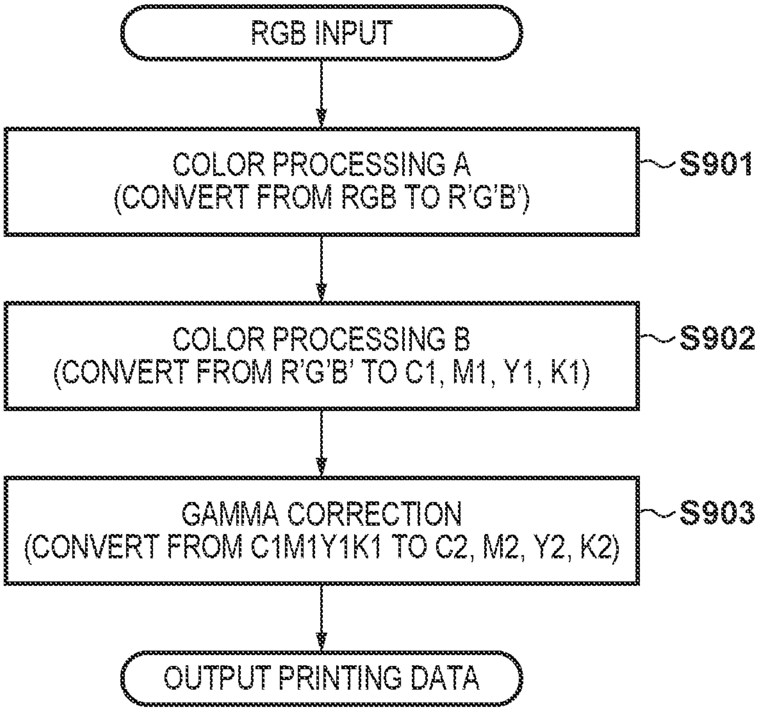
FIG. 9 is a flowchart for explaining printing data generation processing according to the first embodiment.

In this case, a method of converting RGB image data serving as general input data into the printing data corresponding to each ink color of CMYK will be described. FIG. 9 is a flowchart for explaining the printing data generation processing according to the first embodiment.

In step S901, the MPU 102 converts the RGB original image signals obtained by the image input device, such as a digital camera or scanner or obtained by computer processing and the like, into image signals R'G'B' (color processing A). The color processing A is processing of converting the original image signals RGB into the image signals R'G'B' fit in the color reproduction range of the printing apparatus. In this embodiment, the input resolution of the multi-valued image data is given by 600 dpi×600 dpi and is luminance data (R, G, B) expressed by 8-bit 256 tone levels per pixel.

In step S902, the MPU 102 converts the R'G'B' signals into signals corresponding to the respective ink colors (color processing B). In this case, the MPU 102 converts the multi-valued output data of the respective ink colors into data expressed by 12-bit 4,096 tone levels per pixel having the resolution of 600 dpi×600 dpi. The converted signals are density signals C1, M1, Y1, and K1 corresponding to the four colors, that is, cyan, magenta, yellow, and black. In the color processing B, a three-dimensional look-up table (3D LUT) of the CMYK output values for the R'G'B' input values is used to obtain the output values (the density signals C1, M1, Y1, and K1). As for the R'G'B' input values falling outside the lattice points of the 3D LUT, interpolation operation using the output values of the surrounding lattice points is performed.

In step S903, MPU 102 performs gamma correction for the density signals C1, M1, Y1, and K1 by using the correction table to obtain C2, M2, Y2, and K2. In this case, the MPU 102 converts 12-bit data having the resolution of 600 dpi×600 dpi of each color into 8-bit 256 tone data. By performing image processing in steps S901 to S903, the printing data corresponding to the respective ink colors can be generated. A description will return to the description with reference to FIG. 6.

In step S602, the MPU 102 analyzes data stored in the print buffer 121 and deployed in step S601 and counts the printing dot count (Bandnum) of one scan. The printing dot count may be singly expressed as "Bandnum". The printing dot count and Bandnum have the same meaning. The MPU 102 counts, as the printing dot count (Bandnum), a value obtained by adding the drive counts of the printing elements of four CMYK colors.

In step S603, the MPU 102 compares the printing dot count (Bandnum) counted in step S602 with the maximum printing dot count of one scan described above. If the MPU 102 determines that the counted printing dot count (Bandnum) is equal to or smaller than the maximum printing dot count of one scan (YES in step S603), the process advances to step S604. In this case, assume that the printing dot count (Bandnum) counted in step S602 is given as 3,932,160, and the maximum printing dot count of one scan is given as 4,915,200.

On the other hand, if the MPU 102 determines that the counted printing dot count (Bandnum) is not equal or less than the maximum printing dot count of one scan (NO in step S603), the process advances to step S606. In this case, assume that the printed dot count (Bandnum) counted in step S602 is given by 5,406,720 dots, and the maximum printing dot count of one scan is given as 4,915,200 dots. As described above, the scan average dot count per unit time exceeds the maximum printing dot count per unit time only by the setting of the wait time within the maximum wait time. For this reason, in step S603, the MPU 102 determines whether processing for reducing the scan average dot count per unit time by a plurality of scans is performed.

(If Bandnum≤Scan Maximum Printing Dot Count)

In step S604, the MPU 102 sets the wait time of 0.080 s corresponding to the printing dot count (Bandnum) of 3,932,160 dots based on the wait time setting table in FIG. 8.

In step S605, the MPU 102 executes the first printing scan and then performs the wait operation of the wait time of 0.080 s, thereby ending the printing scan processing.

(If Bandnum>Scan Maximum Printing Dot Count)

In step S606, the MPU 102 performs dot counting for division area 1 (upper half (256 nozzles) of the printing data in the vertical direction) and division area 2 (lower half (256 nozzles) of the printing data in the vertical direction) in the printing data in the print buffer 121. The printing dot count counted in division area 1 is represented as "Band1num", and the printing dot count counted in division area 2 is represented as "Band2num".

In step S607, the MPU 102 compares Band1num and Band2num counted in step S606 with the maximum printing dot count of one scan. In step S607, if the MPU 102 determines that Band1num is equal to or less than the maximum printing dot count of one scan, and Band2num is equal to or less than the maximum printing dot count of one scan (YES in step S607), the process advances to step S608. In this case, assume that Band1num counted in step S606 is given as 3,932,160 dots, Band2num counted in step S606 is given as 1,474,560 dots, and the maximum printing dot count of one scan is given as 4,915,200 dots.

On the other hand, in step S607, if the MPU 102 determines that Band1num is equal to or less than the maximum printing dot count of one scan, and Band2num is not equal to or less than the maximum printing dot count of one scan (NO in step S607), the process advances to step S612. In this case, assume that Band1num of division area 1 counted in step S606 is given as 5,406,720 dots, Band2num of division area 1 counted in step S606 is given as 1,474,560 dots, and the maximum printing dot count of one scan is given as 4,915,200 dots.

(If Band1num≤Maximum Printing Dot Count of One Scan, and Band2num≤Maximum Printing Dot Count of One Scan)

In step S608, the MPU 102 divides the printing data of the print buffer 121 into division area 1 (upper half (256 nozzles) of the printing data in the vertical direction) and division area 2 (lower half (256 nozzles) of the printing data in the vertical direction). In this case, FIGS. 10A and 10B are views for explaining a printing method in accordance with the presence/absence of the division of the printing data according to the first embodiment.

Figure 10B:
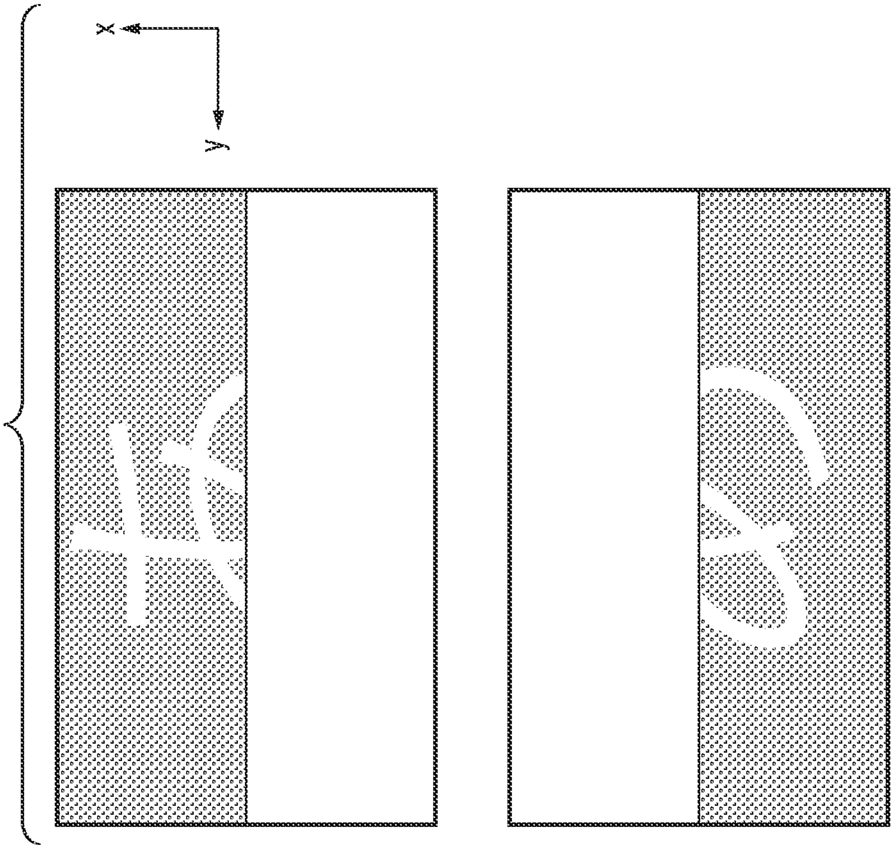
FIG. 10B is a view for explaining the printing method corresponding to the presence/absence of the division of the printing data according to the first embodiment.
Figure 10A:
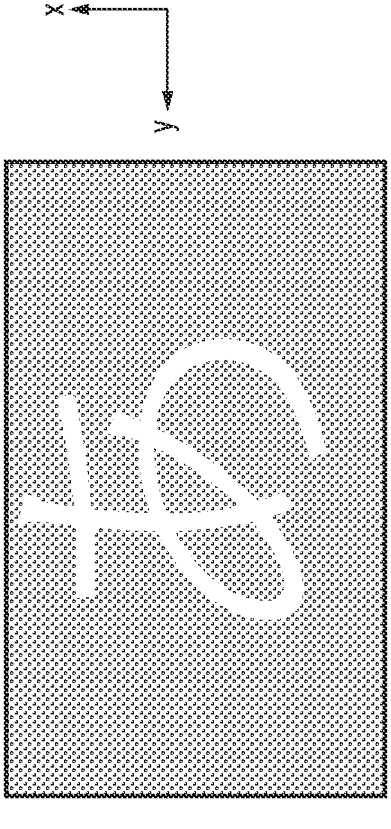
FIG. 10A is a view for explaining a printing method corresponding to the presence/absence of the division of the printing data according to the first embodiment.

The horizontal direction in FIGS. 10A and 10B is the scan direction (the Y direction) of the printhead 9. The vertical direction in FIGS. 10A and 10B is the direction (the X direction) in which the printing elements of the printhead 9 are arrayed. FIGS. 10A and 10B show images printed by one scan of the printhead 9. The length in the vertical direction corresponds to the length along which the printhead 9 performs one scan, that is, the width along which the printing elements are arrayed. Note that FIGS. 10A and 10B show images printed using one printing element array of the printhead 9.

FIG. 10A shows the image printed by one scan using all the printing elements arrayed in the printhead 9 based on the non-divided printing data.

FIG. 10B shows the image printed by two scans based on the two-divided printing data. The upper image in FIG. 10B is the image printed by one scan using the upper half (a first printing element group) of the printing element of the printhead. On the other hand, the lower image in FIG. 10B is the image printed by one scan using the lower half (a second printing element group) of the printing element array of the printhead. In this manner, in divided printing, the 512 printing elements arrayed on the printhead 9 are divided into the upper and lower halves. The image is printed using the upper half printing element array and the lower half printing element array. More specifically, the image is printed using 1 to 256 printing elements of the upper half of the printing element array in the first scan. The image is printed using 257 to 512 printing elements of the lower half of the printing element array in the second scan. In this manner, in divided printing, the number of printing elements for discharging the ink droplets is limited in one scan, and the scan average dot count per unit time of the printhead 9 can be reduced. Note that as the method of dividing the printing data, for example, a method of thinning the printing data using a mask pattern or the like may be used. A description returns to the description with reference to FIG. 6.

In step S609, the MPU 102 sets the wait times respectively corresponding to Band1num and Band2num for division area 1 and division area 2 based on the wait time setting table in FIG. 8. That is, the wait time corresponding to Band1num (3,932,160 dots) of division area 1 is 0.080 s. The wait time corresponding to Band2num (1,474,560 dots) of division area 2 is 0.000 S.

In step S610, the MPU 102 executes printing scan of division area 1 and then performs the wait operation for the wait time of 0.080 s set in step S609.

In step S611, the MPU 102 executes the printing scan of division area 2 and ends the printing scan processing procedure. Incidentally, since the wait time in division area 2 is 0.000 s, the MPU 102 does not execute the wait operation.

If Band1num≤Maximum Printing Dot Count of One Scan, and Band2num>Maximum Printing Dot Count of One Scan)

In step S612, the MPU 102 divides the printing data of the print buffer 121 into three parts, that is, division area 1 (84-nozzle upper area of the printing data in the vertical direction), division area 2 (84-nozzle central area of the printing data in the vertical direction), and division area 3 (88-nozzle lower area of the printing data in the vertical direction).

In step S613, the MPU 102 executes the printing scan according to (based on) the printing data of division area 1.

In step S614, the MPU 102 executes the printing scan according to the printing data of division area 2.

In step S615, the MPU 102 executes the printing scan according to the printing data of division area 3 and ends the printing scan processing. Note in each of the processes in steps S613 to S615, the wait time is not set due to the following reason. When printing is performed using 3-division printing data, the maximum printing dot count of one scan is given as 88 nozzles×8 inches×600 dpi×4 colors=1,689,600. In this case, the maximum printing dot count of one scan is 4,915,200. In this manner, even if the wait time is not set for the maximum printing dot count (1,689,600 dots) of one scan when performing printing using the 3-division printing data, a fact that the maximum printing dot count of one scan is equal to or less than the printing scannable maximum printing dot count (4,915,200 dots) can be grasped. For this reason, when printing is performed using the 3-division printing data, no wait time is set. A description will return to the description with reference to FIG. 5.

In step S505, the MPU 102 determines whether printing for one page of the print medium P is ended. If the MPU 102 determines that printing is ended (that is, printing data remains) (NO in step S505), the process returns to step S504. The MPU 102 performs the generation of the printing data of the next scan and continues printing processing until the end of printing according to (based on) the printing data. On the other hand, if the MPU 102 determines that the printing is ended (that is, no printing data remains) (NO in step S505), processing is ended.

According to this embodiment, since the scan speed of the carriage unit 2 at the time of printing scan is constant in each scan, as compared with the conventional technique, the image output by suppressing the degradation of the image quality which is generated by the scan speed difference between the scans can be performed. In addition, according to this embodiment, since the wait time and scan count (the division number of the printing data) are adjusted, and the scan average dot count per unit time is controlled, the printing operation which suppresses the decrease in throughput can be performed.

As the wait time after the final printing scan processing of one page, a time equal to or less than the wait time designated by the wait time setting table in FIG. 8 may be set because the discharge of the printed product and paper feed of the next page are performed after the final printing scan of one page, and driving of the printhead 9 is not performed. In this manner, a time corresponding to the wait time is substantially generated after the final printing scan. That is, due to the presence of the substantial wait time according to the paper feed and paper discharge operations of the printing apparatus, the scan average dot count per unit time can be reduced. In addition, an effect such as improvement of the throughput by shortening of the wait time after the end of the final printing scan of one page can be obtained.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-051988, which was filed on Mar. 28, 2023 and which is hereby incorporated by reference herein in its entirety.

What is claimed is:

1. An inkjet printing apparatus comprising:

at least one processor, and at least one memory coupled to the at least one processor, the at least one memory storing instructions that, when executed by the at least one processor, cause the at least one processor to:

count a number of printing dots in one scan executed based on printing data used in one scan of a printhead having a plurality of printing elements; and, as a condition that the counted number of printing dots does not exceed a threshold, without dividing the printing data used in one scan of the printhead, set a wait time after processing of the one scan such that an average printing dot count per unit time obtained from the counted number of printing dots does not exceed an allowable printing dot count per unit time.

2. The inkjet printing apparatus according to claim 1, wherein based on information in which a number of printing dots in one scan and a wait time correspond to each other, the at least one processor sets the wait time corresponding to the counted number of printing dots.

3. The inkjet printing apparatus according to claim 2, wherein the threshold is a value which is set as a maximum printing dot count in one scan, and the allowable printing dot count per unit time is a value which is set based on a restriction of an allowable average current amount per unit time in the inkjet printing apparatus.

4. The inkjet printing apparatus according to claim 1, wherein if the counted number of printing dots exceeds the threshold, the at least one processor divides the printing data into first printing data associated with a first printing element group in the plurality of printing elements and second printing data associated with a second printing element group that is different from the first printing element group in the plurality of printing elements, and the at least one processor counts, as a first printing dot count, a number of printing dots in one scan executed based on the first printing data, and counts, as a second printing dot count, a number of printing dots in one scan executed based on the second printing data.

5. The inkjet printing apparatus according to claim 4, wherein if the first printing dot count is not more than the threshold, and the second printing dot count is not more than the threshold, the at least one processor sets a wait time after processing of the one scan corresponding to the first printing dot count such that an average printing dot count per unit time obtained from the first printing dot count does not exceed the allowable printing dot count per unit time, and sets a wait time after processing of the one scan corresponding to the second printing dot count such that an average printing dot count per unit time obtained from the second printing dot count does not exceed the allowable printing dot count per unit time.

6. The inkjet printing apparatus according to claim 4, wherein if the first printing dot count is not more than the threshold, and the second printing dot count representing exceeds the threshold, the at least one processor divides the printing data into not less than three printing data respectively corresponding to not less than three printing element groups in the printing data.

7. The inkjet printing apparatus according to claim 1, wherein the instructions, when executed by the at least one processor, further cause the at least one processor to obtain a printing mode of the printhead.

8. The inkjet printing apparatus according to claim 7, wherein the printing mode includes pieces of information which associate a type and a printing quality of a print medium, a printing pass count of the printhead, a scan speed, and a maximum wait time, and the threshold is a maximum printing dot count corresponding to the maximum wait time and indicating an upper limit of a number of printing dots in one scan.

9. The inkjet printing apparatus according to claim 1, wherein the plurality of printing elements comprise a plurality of electrothermal conversion elements, and the printhead comprises the plurality of printing elements and a plurality of discharge ports facing the plurality of printing elements and configured to discharge a printing material to a printing medium side.

10. The inkjet printing apparatus according to claim 1, wherein the at least one processor sets a wait time such that a wait time after the printhead completes all printing operations according to printing data of one page to a time shorter than the wait time after printing according to some of the printing data of one page.

11. The inkjet printing apparatus according to claim 1, wherein the instructions, when executed by the at least one processor, further cause the at least one processor to control a printing operation of the printhead based on a setting result.

12. The inkjet printing apparatus according to claim 1, wherein the setting of the wait time is executed before starting printing of the printhead.

13. A method comprising:

counting a number of printing dots in one scan executed based on printing data used in one scan of a printhead having a plurality of printing elements; and, as a condition that the counted number of printing dots does not exceed a threshold, without dividing the printing data used in one scan of the printhead, setting a wait time after processing of the one scan such that an average printing dot count per unit time obtained from the counted number of printing dots does not exceed an allowable printing dot count per unit time.

14. A non-transitory computer-readable storage medium storing instructions that, when executed by a computer, cause the computer to perform a method comprising:

counting a number of printing dots in one scan executed based on printing data used in one scan of a printhead having a plurality of printing elements; and, as a condition that the counted number of printing dots does not exceed a threshold, without dividing the printing data used in one scan of the printhead, setting a wait time after processing of the one scan such that an average printing dot count per unit time obtained from the counted number of printing dots does not exceed an allowable printing dot count per unit time.

* * * * *